United States Patent
Suppes

(10) Patent No.: US 10,322,729 B2
(45) Date of Patent: Jun. 18, 2019

(54) TERREPLANE TRANSPORTATION SYSTEM

(71) Applicant: Galen J. Suppes, Columbia, MO (US)

(72) Inventor: Galen Suppes, Columbia, MO (US)

(73) Assignee: The Suppes Facility Trust, Columbia, MO (US)

( * ) Notice: Subject to any disclaimer, the term of this patent is extended or adjusted under 35 U.S.C. 154(b) by 0 days.

(21) Appl. No.: 15/204,345

(22) PCT Filed: Dec. 29, 2015

(86) PCT No.: PCT/US2015/067799
§ 371 (c)(1),
(2) Date: Jul. 7, 2016

(87) PCT Pub. No.: WO2016/109490
PCT Pub. Date: Jul. 7, 2016

(65) Prior Publication Data
US 2016/0355194 A1 Dec. 8, 2016

Related U.S. Application Data

(60) Provisional application No. 62/097,921, filed on Dec. 30, 2014, provisional application No. 62/116,857, filed on Feb. 16, 2015, provisional application No. 62/129,261, filed on Mar. 6, 2015, provisional application No. 62/158,569, filed on May 8, 2015, provisional application No. 62/189,257, filed on Jul.
(Continued)

(51) Int. Cl.
*B61B 3/00* (2006.01)
*B64C 39/02* (2006.01)
*B61B 13/08* (2006.01)

(52) U.S. Cl.
CPC ........... *B61B 3/00* (2013.01); *B61B 13/08* (2013.01); *B64C 39/022* (2013.01); *Y02T 30/30* (2013.01)

(58) Field of Classification Search
CPC .. B61C 11/06; B60V 3/04; B61B 3/02; B61B 13/08; Y02T 30/30; B64C 39/022
USPC ...................................................... 104/23.1
See application file for complete search history.

(56) References Cited

U.S. PATENT DOCUMENTS

| | | | | |
|---|---|---|---|---|
| 1,422,394 A | * | 7/1922 | Wagner | B61B 3/02 104/23.1 |
| 1,636,619 A | * | 7/1927 | Archer | B61B 3/02 104/122 |

(Continued)

*Primary Examiner* — Zachary L Kuhfuss

(57) ABSTRACT

The Terreplane Transport System is a ground-based transportation comprised of flying vehicles pulled by a propulsion line. An important design feature of the most preferred system is that the propulsion line only experiences longitudinal forces during flight making low-cost propulsion lines possible. A propulsion carriage engages the propulsion line to create acceleration. A connection arm connects the vehicle to the propulsion carriage whereby the cumulative interaction includes the ability to convert impacting and overflowing air into lift complete with control to provided controlled flight based on the longitudinal force conveyed from the propulsion line to the propulsion carriage. The preferred method of conveying the longitudinal force is through linear motors utilizing novel longitudinally asymmetric coils. Novel embodiments include a wind turbine compatible with the guide way structures and an extended application of a bent horseshoe electromagnet for projecting inserts.

11 Claims, 3 Drawing Sheets

Related U.S. Application Data 7, 2015, provisional application No. 62/192,490, filed on Jul. 14, 2015, provisional application No. 62/205,710, filed on Aug. 15, 2015, provisional application No. 62/206,358, filed on Aug. 18, 2015.

(56) References Cited

U.S. PATENT DOCUMENTS

| | | | | |
|---|---|---|---|---|
| 1,723,352 A * | 8/1929 | Hohberger | | B61B 3/00 104/23.1 |
| 1,798,852 A * | 3/1931 | Roghmanns | | B61B 3/02 104/23.1 |
| 2,976,820 A * | 3/1961 | Schaar | | B61B 13/04 104/23.1 |
| 3,233,556 A * | 2/1966 | McDonald | | B60V 3/04 104/136 |
| 3,244,113 A * | 4/1966 | Smyser | | B61B 3/02 104/112 |
| 3,444,823 A * | 5/1969 | Akmentin | | B60V 3/04 104/134 |
| 3,477,389 A * | 11/1969 | Trent | | B61B 13/04 104/118 |
| 3,774,542 A * | 11/1973 | Walsh | | B61B 3/02 104/123 |
| 3,919,944 A * | 11/1975 | Jorg | | B60V 1/22 104/23.1 |
| 4,703,697 A * | 11/1987 | Bell | | B61C 11/06 104/134 |
| 4,841,871 A * | 6/1989 | Leibowitz | | B61B 13/04 104/139 |
| 4,941,406 A * | 7/1990 | Lay | | B61B 13/08 104/23.1 |
| 5,215,015 A * | 6/1993 | Iida | | B61B 13/08 104/23.1 |
| 5,222,689 A * | 6/1993 | Simuni | | B60V 3/04 104/23.1 |
| 5,535,963 A * | 7/1996 | Lehl | | B60V 3/04 104/23.1 |
| 5,653,174 A * | 8/1997 | Halus | | B61B 13/08 104/112 |
| 7,624,684 B2 * | 12/2009 | Morris | | E01B 25/16 104/112 |
| 8,015,925 B2 * | 9/2011 | Simon | | B60M 7/00 104/124 |
| 8,261,668 B2 * | 9/2012 | Weinbaum | | B60V 3/04 104/23.1 |
| 8,371,226 B2 * | 2/2013 | Timperman | | B60V 3/04 104/23.1 |
| 2008/0110367 A1 * | 5/2008 | Roane | | B60F 1/04 105/72.2 |

* cited by examiner

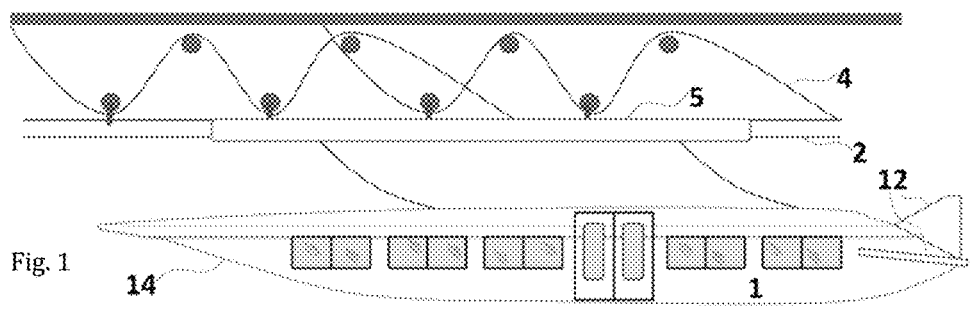
Fig. 1
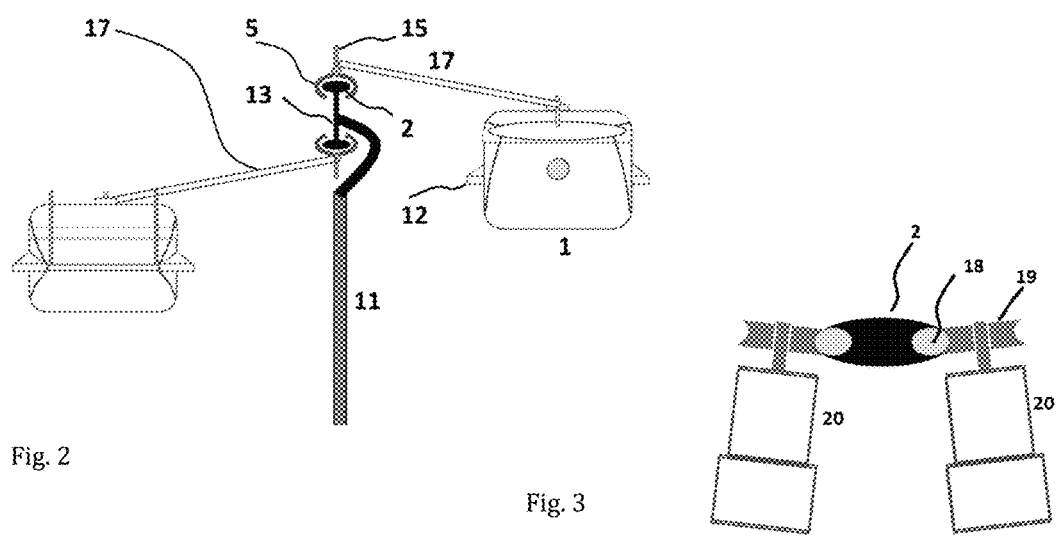
Fig. 2
Fig. 3
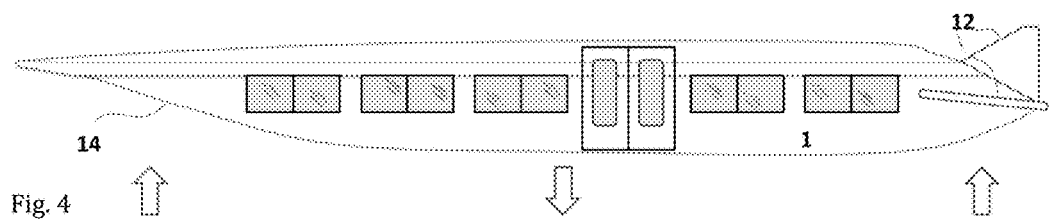
Fig. 4
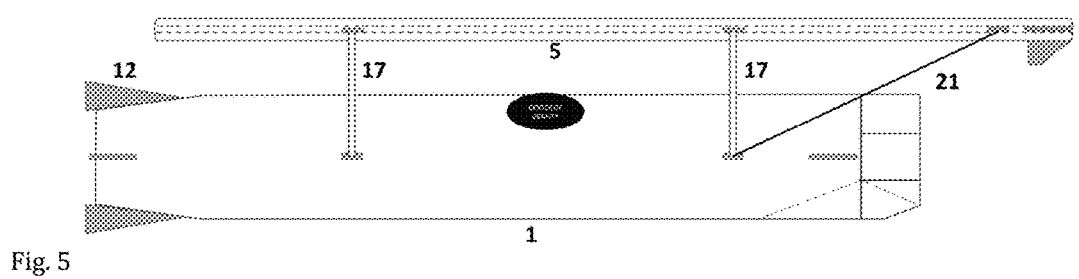
Fig. 5

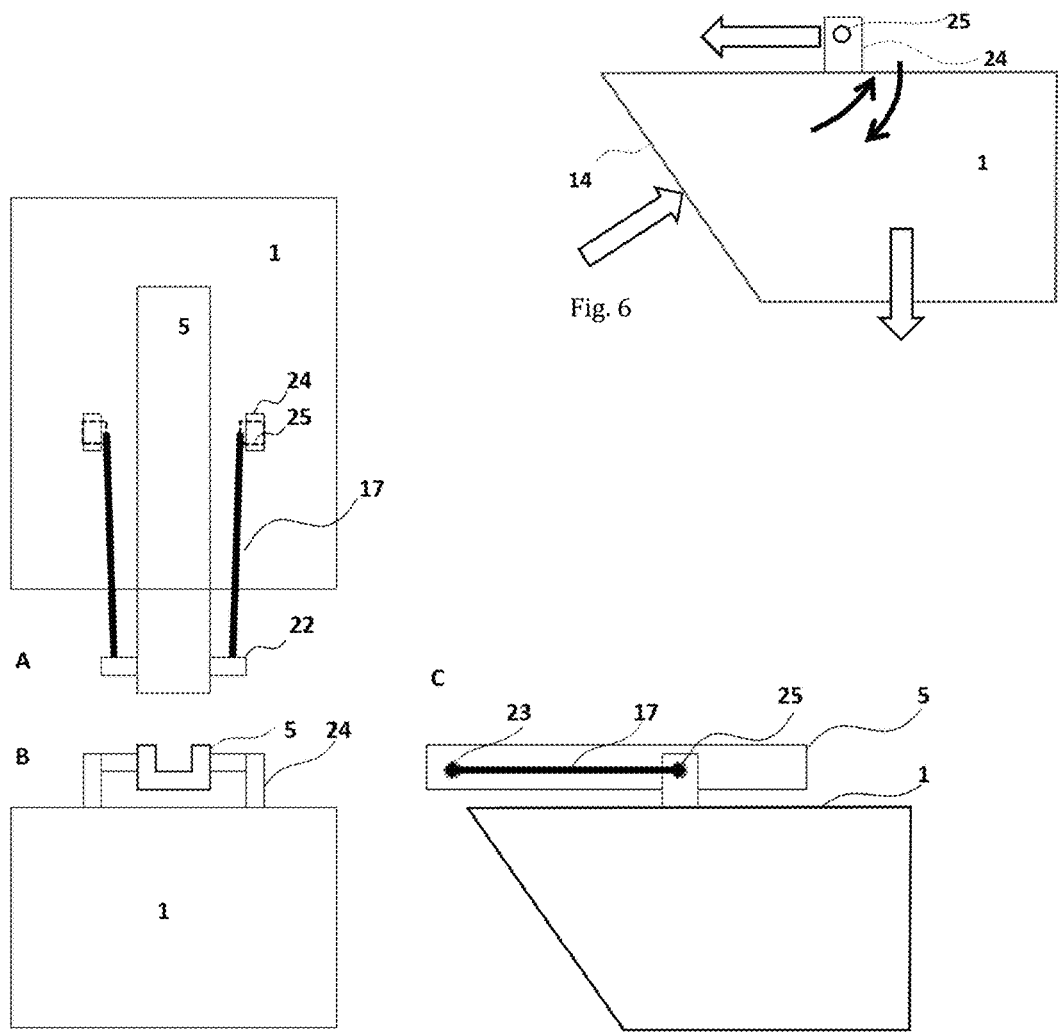
Fig. 6
Fig. 7
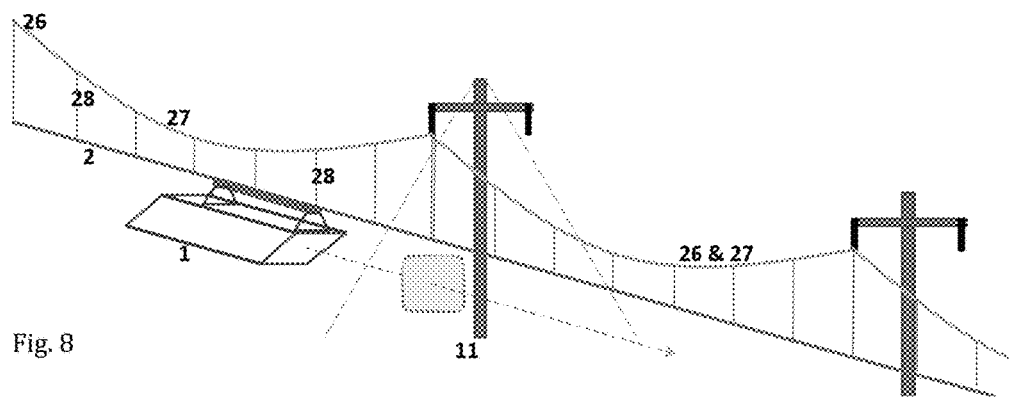
Fig. 8

TERREPLANE TRANSPORTATION SYSTEM

CROSS REFERENCE TO RELATED APPLICATIONS

This application claims the benefit of provisional application Ser. No. 62/097,921 filed Dec. 30, 2014 entitled "Terreplane-(Transit System)"; Ser. No. 62/116,857 filed Feb. 16, 2015 entitled "Energy Saving Inventions" Energy Related Inventions Ser. No. 62/129,261 filed Mar. 6, 2015 entitled "Energy Saving Inventions"; Ser. No. 62/158,569 filed May 8, 2015 entitled "Terreplane System Plus"; Ser. No. 62/189,257 filed Jul. 7, 2015 entitled "Terreplane System Plus"; Ser. No. 62/192,490 filed Jul. 14, 2015 entitled "Terreplane System Coils"; Ser. No. 62/205,710 filed Aug. 15, 2015 entitled "Terreplane System"; and Ser. No. 62/206,358 filed Aug. 18, 2015 entitled "Energy Related Inventions". This application claims benefit of PCT application entitled "Terreplane Transportation System" filed on Dec. 29, 2015 application number PCT/US 15/67799.

FIELD

The present invention relates to transportation systems. More specifically this invention relates to a ground-based transportation system with vehicles that attain aerodynamic lift and to not require a rail or road.

BACKGROUND

This invention is on embodiments of a Terreplane Transit System (aka Terreplane). The following are characteristics of preferred embodiments: a) the vehicles are connected to an overhead propulsion carriage that propels along a stationary propulsion line, b) at least half of vehicle weight is supported by aerodynamic lift (combinations of impact momentum and Bernoulli-type lift), and c) a guideway to support vehicle weight (separate from the propulsion line) is not necessary due to the aerodynamic lift on the vehicle. For purposes of this document, aerodynamic lift is lift resulting from the interaction of the vehicle surface with air hitting and or moving around the vehicle surface and does not include lift as a result of air being discharged from the vehicle (e.g. downward facing jets).

A guidway is defined as "a structure, often made of concrete or steel, that is used to support and guide trains or individual vehicles that ride over it". In this document, when the term guideway includes such things as a road, highway, or rail track; but does not include the propulsion line of Terreplane embodiments.

The propulsion lines of the embodiments of this invention are not designed to support the weight of vehicles during normal travel. In certain embodiments the propulsion line may support the weight of a stalled vehicle; however, in supporting the weight of the stalled vehicle the propulsion line may deflect the propulsion line to an extent that is not suitable for the design specifications applicable to higher velocity travel.

Hence, a guideway is designed not to exceed a certain amount of deflection resulting from vehicle weights. Excess deflection can result in unacceptably high g-forces on the vehicle/passengers when following the deflection at higher design velocities of the transit system.

Just like the seats of a vehicle are connected to tires through a series of structural and dampening devices resulting in the passenger experiencing few disturbances from bumps on a road, so also, structural and dampening devices between the vehicle and propulsion carriage allow for designs that can maintain vertical and lateral forces on the propulsion line that are less than 0.1% of the vehicle weight.

For fast-moving vehicles, the magnitude of the deflection of the propulsion line is related to the time of the deflecting force. At high travel velocities (e.g. 300 miles per hour), the time a vehicle is between the structures supporting the propulsion line can become exceedingly small leading to the desired goal of low deflection of the propulsion line. This represents a synergy between high-speed travel, achieving aerodynamic lift, and maintaining low deflection of the propulsion line.

A primary benefit of the embodiments of Terreplane embodiments is that it costs considerably less to build propulsion line as compared to guideways.

Terreplane is different than a ski lift or gondola system since the propulsion line of the Trerreplane transit system is stationary while the propulsion line of a gondola moves along the direction of travel. The vehicles of Terreplane are able to travel much faster than gondola vehicles since the propulsion line of Terreplane is a relatively straight as compared to the repeated sagging deflection of gondola propulsion lines.

The vehicles of Terreplane are different than air planes or jets because the vehicles are (preferably) pulled along a propulsion line that is attached to the ground.

Terreplane is different than guideway-based transit systems (e.g. trains with railway tracks, monorail tracks, overhead monorail tracks, roads/highways) since Terreplane does not have the high costs of the guideway infrastructure. In the most-preferred Terreplane Transit System embodiments, the vertical and lateral forces on the vehicle are supported and controlled by aerodynamic forces/interactions rather than interactions with a guideway. In the most preferred mode of travel of Terreplane, the only significant force on the propulsion line is a longitudinal force (force along path of travel) used to propel the vehicle.

Embodiments of a Terreplane Transit System may be placed in a tunnel where the gas pressure is less than atmospheric pressure.

No guideway is needed for Terreplane. The Terreplane travels along a propulsion line that has high tensile strength such as a cable. Ultra-high travel velocities are possible with Terreplane if it is placed in tunnels. In these tunnels, the vehicles pump the air through the tubes resulting in air velocity in the direction of travel. Terreplane vehicles are designed to be light weight so they can attain flight like a pulled glider. Terreplane can share the right-of-way with railroad lines, city streets, highways, and even parks.

With Terreplane, increasing velocities lead to increased lift with the ability to increase passenger capacity or reduce drag. Once the vehicle has achieved lift-off velocity, vehicle orientation/pitch as well as adjustable flaps and wings are the preferred means to match the aerodynamic lift with the weight of the vehicle.

BRIEF DESCRIPTION OF THE DRAWINGS

FIG. 1 is an illustration of side views of a Terreplane vehicle with a propulsion line attached to a structure and pulley connections that facilitate tensile-straightening of the propulsion line.

FIG. 2 is an illustration of a single beam structure supporting two propulsion lines that facilitate a bi-directional Terreplane Transit System.

FIG. 3 is an illustration of two wheels engaging opposite sides of a propulsion line with electrical contact of two different conductive cables in the propulsion line.

FIG. 4 is an illustration of Terreplane vehicle with lift forces on front vehicle, lower vehicle surface, and back wings or flaps with a balancing downward force acting on the center of gravity.

FIG. 5 is an illustration of Terreplane vehicle with asymmetric front and a flap on teh propulsion carriage to balance torque.

FIG. 6 is an illustration of vertical and longitudinal force (straight arrows) and torque (curved arrows) balances on a Terreplane vehicle.

FIG. 7 is an illustration of the use of a vehicle's vertically-extended arm connections to allow both ends of the connection arms to be in the same horizontal plane as the propulsion line.

FIG. 8 is an illustration of a propulsion line suspended from an electrical power line with insulated connectors.

SUMMARY

Figure 9:
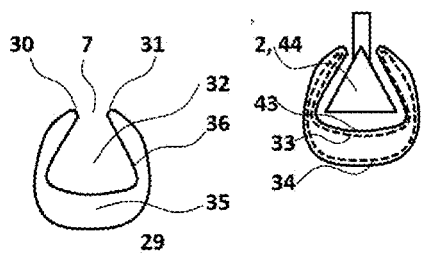
FIG. 9 is an illustration of two open-sided coils with one on rights showing a triangle-cross-section propulsion line and dashed line for wire of coil.

The Terreplane vehicle 1 is the vehicle (FIG. 1) of a land-based transportation system that is pulled like a glider where during normal operation a substantial part of the vehicle weight is supported by impact momentum from the air impacting vehicle surfaces. At high travel velocities, air always impacts front-facing surfaces and creates a resistance to travel.

The Terreplane vehicle 1 travels along a propulsion line 2 where the propulsion line (FIG. 1) is a guideway that defines the path of travel. Dimensionally, the path of the propulsion line is the longitudinal dimension where the other dimensions that complete spatial coordinate definition are the vertical dimension and the lateral dimension where the lateral dimension is horizontal and perpendicular to the longitudinal dimension. The propulsion line is a longitudinally extending structure that has electromagnetic and/or reactive materials that functionally provide propulsion forces. Optionally, the wheels may press against the propulsion line to provide propulsion whereby electromagnetic and/or reactive materials are not required.

Preferably the propulsion line is connected to a propulsion line joist 3, which is a longitudinally extending structure. The joist provides stiffness against deviations from a straight longitudinal path (stiffness against deflection).

An example of a simple joist is a long beam of wood that has a height that is typically at least three times its thickness. More complex joists may have flanges on the top and bottom of the beam where the widths of the flanges are typically at least twice the thickness of the beam. Each flange may have a face with the face of the bottom flange directed downwardly and the face of the top flange directed upwardly.

Propulsion line connections 4 connect the propulsion line 2 to a propulsion line joist 3. In some instances, the connections 4 may be a series of pulleys and cables that connect the propulsion line to a support structure other than a propulsion line joist 3. In some instances the propulsion line connections 4 are bolts that directly bolt the propulsion line 2 to a propulsion line joist 3. At the area of contact with the propulsion line 2, the propulsion line connections 4 are typically longitudinally aligned on the propulsion line 2.

A propulsion carriage 5 interacts with the propulsion line 2 to travel along the propulsion line 2. A propulsion carriage tube 6 is an embodiment of the propulsion carriage 5 that partially surrounds the propulsion line 2 it is engaging. The propulsion carriage tube 6 has an overall shape of a tube with a slot 7 along the length of the tube 6 (FIG. 2). While referred to as a tube, the geometry is not limited to that of a cylinder. When a propulsion carriage tube 6 is interacting with a propulsion line 2 to create propulsion forces, the tube 6 is referred to as being engaged with the line 2.

The slot 7 in the propulsion carriage tube 6 is necessary to avoid collision of the propulsion carriage tube 6 with the propulsion line connections 4 when the propulsion carriage tube 6 travels along the propulsion line 2.

Preferred engaging of a carriage 5 with a propulsion line 2 is through repulsive interactions of an electromagnet with alternating current and an electrically conductive reactive material. A tube 6 may include guide wheels that press against the line 2 to create propulsion and suspension as needed.

The path of engagement 8 is the corridor that falls within the inner surface 9 of a propulsion carriage tube 6 as the tube travels along a propulsion line 2. The propulsion line 2 is within the path of engagement 8 as well as the clearance between the propulsion line 2 and the surface of closest approach of the inner surface 9 of the propulsion carriage tube 6 and the propulsion line 2.

A propulsion line system 10 is comprised of a propulsion line(s) that contains either active or reactive components, longitudinally connected joists that provide stiffness toward the goal of a longitudinally straight travel path, and structures for supporting the joints at an elevated position. The propulsion line system 10 may also include suspension cables, and longitudinally aligned connections where the connections may be cables, bolts, or other methods of connection known in the science.

DESCRIPTION OF INVENTION

FIG. 1 illustrates an example Terreplane vehicle 1 that is pulled by (attached to) a propulsion carriage 5 that runs on a propulsion line 2. Preferably, the propulsion carriage 5 and propulsion line form a linear motor for propulsion. The linear motor may be based on repulsive or attractive forces.

The vehicle 1 weight is supported by aerodynamic "lift", just like a plane, during travel except when landing at stations. A computer-control system uses flaps on the vehicle 1 in a manner to create near-zero vertical force on the propulsion line 2; however, some vertical force may be transferred to/from the carriage 5 for increased stability.

Likewise, flaps and asymmetric (relative to the longitudinal-vertical plane) surfaces are used to produce near-zero lateral forces during travel.

To supplement accomplishing near-zero lateral or vertical forces onto the propulsion line 2, the propulsion carriage 5 may have additional flaps. The net result is a Terreplane system path defined by a propulsion line 2 that delivers longitudinal forces in a relatively smooth travel path without sudden changes in direction. Longitudinal forces (tensile forces) on the propulsion line 2 will straighten the propulsion line 2 to allow travel paths without "bumps." To enable this mechanism, flexible attachments to the structural support are used (FIG. 1)—a slight elasticity to the propulsion line 2 is a supplemental enabling characteristic to enable ultra-high-velocity travel.

A result of having the propulsion line 2 with design parameters based primarily on longitudinal forces is the ability to place propulsion lines for travel in opposite directions on the same support structure as illustrated in FIG. 2. The support structure of FIG. 2 approaches that of an I-beam. The tensile strength is a natural capacity of cables and easily attained. The structure should be relatively straight under its own weight. Hybrid systems could use the same structures for electrical lines and the propulsion lines; wherein the incremental cost of the propulsion line 2 is low. Example support structures include: a) posts 11 such as that illustrated by FIG. 2 in the country or along interstates, b) existing highway bridges (propulsion lines attached to sides of bridges), c) attachment to the tops of tunnels including tunnels shared with cars or trains (e.g. stop lights could allow clearing of tunnels in time for Terreplane vehicle travel), and d) special post structures that allow travel along railway lines but at a height above train travel.

The same vehicles 1, propulsion carriages 5, and propulsion lines 2 are compatible with travel ranging from wilderness (where posts are used) to in evaluated tunnels where low pressures allow travel in velocities in excess of 600 mph. The primary difference between these applications is the type of structure (e.g. posts versus top of tunnel) to which the propulsion line is attached. If a tunnel is maintained with sustained air velocities of about 200 mph, the vehicles could cost-effectively travel at velocities approaching 500 mph without use of reduced pressures in the tunnels.

The vehicle 2 depicted by FIG. 1 is presented for illustration purposes and not as an embodiment implying limits of design. Actual vehicles may have smaller are larger flaps that could functionally form wings and may have adjustable span. Bottom surfaces 14 that slope down from the front to the back of the vehicle create lift when air impacts the surface through transfer of momentum—momentum impact is a key component of the vehicle lift. The illustrated vehicle 1 has more lift-creating surfaced on the front half of the vehicle than on the back half; preferred vehicles have lift and torque balanced (minimal torque) around the center of gravity of the vehicle.

Propulsion Carriage—Flaps 12 on the vehicle 1 allow for flight with near-zero lateral and vertical forces transferred to the arms and carriage. Flaps 15 on the propulsion carriage 5 allow for additional fine-tuning and/or elimination of lateral and vertical stresses between the propulsion carriage 5 and propulsion line 2. Finally, the elasticity, rotation of joints 16, dampening capabilities of connections 4, shock absorbers, arms 17, and lines allow for chaotic forces (e.g. wind gusts or passenger movement) to be absorbed allowing for smooth and un-interrupted transit. Optionally, propulsion carriages 5 that are (optionally) longer than the vehicles 1 may connect (preferably with magnetic coupling) into train units. This connection may occur during transit.

Arm Wing Embodiment—Lateral components (at angle or horizontal) of the arm 17 connecting the vehicle 1 to the carriage 5 are preferably in the shape of a wing and provide lift creating an arm wing. Preferably, the arm wing is a swept wing design with the side of the wing connected to the propulsion carriage 5 in a more-forward position so as to provide a torque that counters the torque resulting from drag forces on the vehicle.

Propulsion Lines—The propulsion line 2 is preferably connected to a structure with connections 4 in a manner that allows for adequate movement to allow for this "tensile straightening". The propulsion line 2 itself, preferably, has an elastic property that allows the propulsion line 2 to sequentially: a) straighten as a vehicle 1 approaches, b) support any lateral or vertical forces that reach the line 2, and c) bounce back to an original and stable position after the vehicle has passed. Connections 4 may be by cable, pulleys, braces, dampers, combinations thereof, and by methods known in the science toward the goal of providing elastic properties that tensile straighten.

The propulsion line 2 is preferably relatively straight (with planned curvature to follow the geography or for turning) when a vehicle 1 is not attached or when a vehicle is in transit. However, in emergency situations the vehicle may slow down and aerodynamic lift on the vehicle may be reduced or lost (become stalled)—in these emergency situations the support structure and/or propulsion line may deflect (downward) under stress where such bending is beyond maximum tolerances for high speed travel but within maximum tolerances for slow travel and support of vehicle in emergency situations. In these emergency situations the "tensile straightening" is not needed since the travel velocities are low.

In some emergency instances, the structural support of the propulsion line 2 may be strong enough to support the vehicle for starting travel again. For ultra-low-cost systems, the vehicle 1 may be lowered in open terrain or on emergency support cables specifically located below the vehicle; for these ultra-low-cost systems additional assistance may be needed for vehicle transit to resume, such as a helicopter to attach and provide additional lift until such time that velocity is enough to sustain travel.

Power Transmittal—The primary power consumption in the Terreplane Transit System is for propulsion. The preferred method for transmitting power is in or along the propulsion line 2. An advantage of Terreplane for power generation is that the entire propulsion line 2 and structure (except for poles) tend to be away from easy pedestrian access, and so, power can be transmitted on this structure. FIG. 3 illustrates an example method of power transmission where the propulsion line is comprised to two electrical cables 18 separated by a non-conducting (e.g. polymer) material. Separate wheels 19 from the propulsion carriage 5 turn along the propulsion line surface to provide propulsion and simultaneously connect electrical power to the motor 20 creating the propulsion forces. Methods known in the science would allow the electricity to flow through the propulsion wheels 19 and into the coils of the motor 20. No restrictions are placed on whether electrical power is AC or DC and how the internals of the motor and/or generator complete the circuit.

Some power is stored in batteries in the vehicle 1. Under exceptional conditions (e.g. emergency power, relatively short duration such as less than an hour) of high velocity travel, battery power on the vehicle may be used for propulsion. The propulsion wheels 19 of FIG. 3 provide both contact for power transmission and propulsion forces.

At high travel speeds, the high rotation rates of bearings connected to the shaft of the propulsion wheel 19 can be problematic. The preferred bearings are magnetic or air which would have little to know wear and failure. In designs relying on contact between the rotating and stationary parts of the motor 20, the preferred point of contact is at the end of the rotating shaft and including the center of rotation for a contact; it is this point that has the lower velocities, thus the lowest resistance and lowest rate of wear. The stationary point in contact with the center of rotation can optionally move continuously or periodically to reduce wear on that part. Preferably, the stationary part is the softer and would experience where and it is preferred that conductive lubricants be used such as graphite powder or solid graphite.

Tunnel Travel—The lower resistance of lower pressure environments is preferred at very high travel velocities (e.g. greater than 500 miles per hour) with the optimal pressure being a parameter that is optimized as part of the total system optimization. Lower pressures lead to lower lift, and so, some vehicle 1 weight may remain to be supported by the arms 17 and propulsion line 2. Furthermore, the tunnel provides a structure to which the propulsion line 2 can be attached at closer intervals, enabling the more-cost-effective attaining of the needed stiffness to substantially eliminate deflection at higher vehicle 1 loads such as a load of fifty percent of the weight of the vehicle. Preferably, propulsion carriages 5 are longer than the spacing between connections 4 of the propulsion line 2 to the tunnel ceiling which tends to eliminate load bearing on center points between connections 4. Lift forces from the body of the vehicle support at least half the body weight. Here, the body includes any wings on the vehicle but does not include rotating parts such as on a propeller blade.

Optionally, parts of the vehicle body or extensions of the vehicle body function as air scoops that both create lift by directing air downward. The downward-directed air may be focused on rail embodiments over an area of greater longitudinal length than lateral width. This area of focused air discharge over a rail is referred to as an air ski. This air ski embodiment may be used with railroad train rails. The force may be increased through use of rotary or turbine compression of the scooped air. This air ski embodiment is compatible with acceleration through interactions with a propulsion line.

Force Analyses—For the vehicles 1 of Terreplane, the greater the mass of the vehicle, the more the lift that is needed to support the vehicle's mass, and the greater the force that is needed to pull the vehicle at a given design velocity. Wings on a Terreplane vehicle 1 lead to both more lift and more propulsion energy consumption. These observations lead to rules of thumb for designing Terreplane vehicles 1 as follows: a) keep the mass of the vehicle and carriage as low as possible per passenger, b) transmit energy to the vehicle rather than storing energy on the vehicle unless travel velocities are so high that energy transmission is very costly, c) minimize wing spans as possible for the majority of travel by methods such as retracting wings or using wheels on the vehicle for runways until higher velocities are achieved, and d) use the vehicle body to create lift as possible as an alternative to wings. At lower velocities, nose-upward vehicle pitches that cause more air to impact the bottom of the vehicle lead to more lift. Here, the vehicle pitch can be reduced as velocity increases to maintain a lift that matches vehicle weight.

Takeoff and Landing—Two options for takeoff and landing at stations are a) use of stronger propulsion line structures at stations so the vehicle weight can be supported or b) use of wheels on the vehicle for use at stations when speed is not adequate to provide aerodynamic lift.

Vertical Force Analysis—FIG. 4 illustrates lift forces on an example vehicle 1 embodiment. The preferred modes of providing lift are momentum impacting the bottom of the vehicle 1 and low pressure forming on the back part of the top of the vehicle. Here, bottom sloping surfaces 14 that slope from the vehicle nose to the support of the vehicle's interior are a most important part of the "bottom of the vehicle" that air impacts to create aerodynamic lift.

To promote a passenger compartment of constant cross-section, it is preferred that lift forces focus on the front and back of the vehicle in a manner that leads to zero torque. Flaps 12 on the front (see vehicle nose) and the back of the vehicle allow for fine adjustment of lift with velocity and control of vehicle in response to disturbances such as wind or passenger movement. Similar lift features can be implemented on the propulsion carriage 5 so as to lead to near-zero vertical forces between the propulsion carriage 5 and propulsion line 2.

During switching, lift forces created by flaps 12 can be used to create forces that keep the propulsion carriage in contact with the propulsion line 2. During normal travel, the propulsion carriage preferably surrounds the propulsion line to the extent possible (avoiding supports that connect the propulsion line to structures) such that the propulsion carriage cannot be separated from the propulsion line (safety feature).

A method of switching involves the propulsion line 2 splitting into two independent paths. When the propulsion line splits the flaps allow sufficient unlocking of the physical encasing of the propulsion line 2 so that the carriage 5 follows the preferred path. The force needed to keep the propulsion carriage 5 in contact with the propulsion line 2 during this switch can be achieved with aerodynamic forced induced by the flaps on the propulsion carriage.

Longitudinal Force Analysis—It is preferred to have the vehicle 1 travel as close to the propulsion carriage 5 as possible to minimize torque due to longitudinal forces. Also, it is preferred to design the arms 17 to transfer the torque forces in a manner that does not compromise flight stability. Also, it is desirable to use flaps (vehicle 12 or carriage 15) to counter the torque whereby it is desirable for these flaps to be located distant from the center of gravity to leverage their forces to greater torques.

Lateral Force Analysis—To a first approximation, lateral forces are easily balanced on the vehicle through symmetry. Disturbances such as wind gust can be compensated for by flaps 12 on the top or bottom of the vehicle 1 that convert aerodynamic forces opposite the direction of travel to compensating lateral forces.

The symmetry approach to minimizing lateral torque includes making all aspects of the vehicle 1 and carriage 5 symmetric with respect to the vertical plane along the propulsion line 2. When the vehicle travels on one side of this vertical plane, an asymmetric vehicle design creating an aerodynamic push of the front of the vehicle toward the propulsion line can reduce net torque. Methods known in aerodynamics can be used to create these surfaces on the vehicle.

The preferred solution for medium-velocity applications is illustrated by FIG. 5 where an extended (illustrative) propulsion carriage 5 has flaps 15 on the front that provide a counter-clockwise torque to balance the clockwise torque illustrated by FIG. 5. A cable easily conveys this force to the vehicle. A triangle formed by this cable 21, the front arm, and a section of the carriage provides an overall support structure.

When conditions lead to excessive torque (and need for compensation) such as high velocities, the preferred solution is to have the propulsion line 2 located directly above the vehicle (more lift on the front of the vehicle than on the back). In this application the vertical lift forces on the vehicle can be used to counter the torque forces. FIG. 6 illustrates an example simplified torque balance in such a configuration which uses an improved connector arm. An improved connector arm system embodiment has the advantage of a design where near-zero vertical force between the propulsion carriage 5 and the propulsion line 2 is more-easily attainable during flight. In this improved connector-arm embodiment as illustrated by FIG. 7, a pair of side-mounted propulsion-carriage-arm hubs 22 (hereafter SMPCAH) connect the front-and-upper ends of connection arms 17 to the propulsion carriage via SMPCAH joints 23. The other end of the connection arms 17 (the back and lower end) are connected to a pair of vertically-extended arm connections 24 (hereafter VEAC) attached to the vehicle 1. The arms 17 connect to the VEAC via VEAC joints 25. Preferably, during normal flight the propulsion line 2 and two SMPCHAH joints 23 are in (or nearly in) the same plane and where the propulsion line 2 and two VEAC joints 25 are in (or nearly in) the same plane.

The SMPCAH joints 23 and VEAC joints 25 allow the vehicle 1 to swing down to fly or rest at a lower position relative to the propulsion carriage 5 than the preferred location (FIG. 7) during flight. The joints (23 and 25) are designed to allow vertical movement of the vehicle 1 relative to the propulsion carriage 5. Relative to the vehicle 1 position of FIG. 7, when the vehicle is lower the back of the connection arms 17 are lower than the fronts. The shortest distance between the vehicle 1 and carriage 5 is referred to as the distance of approach.

FIG. 6 illustrates the force vectors in a base case example during preferred normal flight of the vehicle 1. Key aspects of these base case force vectors are: a) a pulling force vector on the VEAC joints 25 with a cumulative vector superimposed on the propulsion line, b) an air momentum impact vector that pushes back and up on the vehicle 1 on a bottom surface 14, and c) a gravitational force vector through the center of gravity of the vehicle 1. In this base case configuration, the only upward force is on front surfaces of the vehicle. In practice designs allow for more surfaces to be effectively used.

Also, FIG. 6 illustrates a torque balance on the base case force analysis. The line of rotation is the line through the VEAC joints 25. Since the pulling force goes through the line of vehicle rotation, the pulling force of the arms 17 does not produce torque. The VEAC joints 25 are located, longitudinally, in front of the center of gravity, and so, gravitational force produces a clockwise torque. The air momentum impact force has a net vector below the VEAC joints 25, and so, the air momentum impact force creates a counter-clockwise torque that balances the torque resulting from gravity. Herein, the preferred embodiment is defined using methods known in the science to create zero net torque about the VEAC joints. This base case illustrates how air impact momentum at the front of the vehicle can be transformed to a lifting force for the entire vehicle.

Preferably, SMPCAH 22 are located toward the front of the propulsion carriage 5. Preferably, VEAC are attached to the top of the vehicle and toward the front of the vehicle 1.

The SMPCAH joints 23 are preferably located such that they are at the same vertical location as the propulsion line 2 during normal travel of the carriage 5 and such that they are the same distance from the propulsion line 2 on opposite sides of the propulsion line 2 (lateral symmetry). Similarly, the VEAC joints 25 are preferably at the same vertical location as the propulsion line 2 during normal travel of the carriage 5 and are the same distance from the propulsion line 2 on opposite sides of the propulsion line 2. As a result of these locations and symmetry, the net force transferred by the connection arm 17 is primarily, if not totally, a longitudinal force.

In this base case design, there is a velocity specific to a vehicle (surface, weight, and center of gravity) that leads to a horizontal pitch for the preferred flight having near-zero vertical force between the propulsion carriage and the propulsion line. Likewise, there are a range of pitches (pitch of vehicle relative to propulsion line) for which each pitch has a single velocity that leads to near-zero vertical forces on the propulsion line.

Optionally, the angles of the VEAC 24 relative to the vehicle 1 are adjustable/controllable in a manner such that they can be set at different angles relative to the vehicle 1. The net impact of adjusting this angle is to move the VEAC joint 25 closer or further back from the front most point of the vehicle. Furthermore, the net impact of moving the VEAC joints 25 along this longitudinal dimension of the vehicle is to change the separation distance of the joints 25 relative to the vehicle's center of gravity (which is substantially not impacted by the movement of the VEAC joints 25). The changing of this separation distance results in a different torque due to gravity which results in a different optimal travel velocity. The optimal travel velocity is the velocity corresponding to the vehicle have a horizontal longitudinal pitch (no pitch relative to propulsion line) corresponding to the zero torque position.

Other methods known in the science for adjusting the separation distance between the VEAC joints 25 and the vehicle's center of gravity may be used, with the critical embodiment specification being that the separation distance can be set at different values. This control method allows for a given horizontal pitch to be attained at the same velocity in the same vehicle with varying centers of gravity (as would result from different passengers or passenger sitting locations).

This base case example illustrates how a vehicle with no wings or flaps can be operated with Terreplane. The additions of wings and flaps are design degrees of freedom that allow for the versatility that is important to meet different demands of different markets.

For a jet aircraft, larger flaps tend to be most important during takeoff and landing rather than during normal flight, and small fast-adjusting flaps tend to be important to compensate for disturbances during normal flight. For the preferred Terreplane vehicle, the bottom of the vehicle, as exposed by the setting of vehicle pitch, makes the vehicle body a large wing for low velocity travel; at designed travel velocities the profile of the vehicle is minimized in the direction of travel (pitch set to zero, horizontal) and small flaps 14 are used to compensate for disturbances. For the lighter-weight propulsion carriage, the pitch is preferably fixed at horizontal and flaps 15 are used for both low velocity lift and to compensate for disturbances at high velocities.

The SMPCAH 22, arm 17, and VEAC 24 comprise the improved connection-arm assembly, and the base case example (FIG. 7) illustrates how a single improve connection-arm assembly can be used to produce flight of the vehicle with only a pulling force on the propulsion line. A vehicle 1 may have more than one improved connection-arm assembly that connects the vehicle 1 to the propulsion carriage 5. A second and back arm may have dampening (shock absorber) abilities that create a smooth and more-easily controlled flight. A dampener or second connection-arm assembly has utility for takeoff, landing, and emergency stopping to compensate for the torque resulting from gravity becoming greater than the torque resulting from air impact momentum. The second connection arm can also transfer lift from the vehicle 1 to the propulsion carriage 5.

By changing the separation distance (VEAC joint 25 to vehicle's center of gravity) on one side of the vehicle relative to the other side, lateral force (as coupled with lift) is generated and may be used to control the vehicle, lessening the need for control flaps on the vehicle.

Preferably, aerodynamic lift (from air impact or wings) compensates for vehicle weight. The energy expended for transit is primarily to generate the pulling force, and so, the less drag on the vehicle the less the energy needed for transit. The resulting heuristic is that as much of the drag force as possible should be converted to lift force to minimize energy consumption, and this is accomplished by vehicle surfaces that create lift and convert air impact momentum into upward force to the extent possible without increasing drag.

Automobile Attachment—The VEAC 24 may be a removable attachment to an automobile. With the control flaps 12 being placed on the VEAC 24 rather than on the automobile, an automobile designed for travel on highways can connect to a VEAC 24 for transit on Terreplane. The automobile would need to meet specific aerodynamic design constraints, but no additional control hardware would be needed.

Optionally, an automobile may attach to a shell contour (attached to a VEAC) that covers the front of the automobile to provide a lift while the vehicle itself may retain a body design that is of standard aesthetics.

Control Strategy Improved Connector Arm System—A Terreplane vehicle 1 without flaps using the improved connector-arm system has the following degrees of freedom to control vertical forces: a) the angle of the arm 17 relative to the propulsion line 2 with center of pivot at the SMPCAH joint 23, b) the angle of the arm 17 relative to the vehicle 1 with center of pivot at the VEAC joint 25, and c) the shortest distance of separation between the front most point (or line) of the vehicle and the VEAC joint 25. These three degrees of freedom are used to meet the following objectives during normal flight: a) zero vertical force of the arm 17 on the SMPCAH joint 23, b) an aerodynamic lift (including impact momentum) on the vehicle that is equal to the vehicle weight, and c) a zero net torque on the vehicle around the free pivot of the VEAC joint 25. The preferred method to achieve these objectives during normal flight is as follows: a) control/assist the angle of the arm 17 relative to the propulsion line 2 with center of pivot at the SMPCAH joint 23 to achieve the angle of zero degrees (more specifically, the angle where the force vector on the joint is in the longitudinal direction) such as through use of hydraulics or springs that encourage this angle of zero degrees, b) control/assist the angle of the arm 17 relative to the top of the vehicle at the VEAC joint 25 to a pitch that impacts the aerodynamics such that vehicle lift equals vehicle weight (e.g. more lift can typically be created by lifting the nose of the vehicle more upward), and c) control the distance of separation between the VEAC joint 25 and the front most point of the vehicle so as to create near-zero torque on the vehicle.

In this most-preferred mode of operation, a rear arm between the vehicle 1 and propulsion carriage 5 primarily serves the purposes of dampening against disturbances during normal flight and of supporting weight as necessary when traveling at lower velocities such as during takeoff. Dampening built into the arms and joints as well as flaps is the preferred method to handle disturbances.

Certain of the components may be combined to functionally achieve the same purpose. For example, the SMPCAH joint 23, arm 17, and VEAC joint 25 may be combined to a damper embodiment that connects the propulsion carriage to the vertically extended arm connections whereby the propulsion carriage is buffered from movements of the vehicle but connected at the preferred locations whereby the ability to change the angle between the propulsion carriage and vehicle to adjust vehicle pitch is preserved.

Single Wheel Support—At lower velocities the lift of the vehicle may not be sufficient to support the vehicle. In these instances, all or part of the weight of the vehicle may be supported by wheels on the bottom of the vehicle that are in contact with the ground, concrete surface, cable, or other support structure below the vehicle. A preferred approach when part of the weight is supported by the arms is to use a single wheel below the vehicle to minimize the cost and weight associated with the wheels.

Optionally, pairs of vehicle 1 wings (opposite members of a pair being at the same location and on opposite sides of the propulsion line, symmetric relative to vertical plane going through propulsion line) may extend above the propulsion line so that at least part of the drag is located above the propulsion line to counter components of drag force with vectors below the propulsion line.

Suspension Bridge Embodiment—In some embodiments it is preferred to use a support cable 26 that that dips/sags between posts (like the structural cable of a suspension bridge) where the propulsion line 2 is connected to the support cable 26 in a manner that maintains a relatively straight propulsion line.

The preferred bridge for the Terreplane System is a suspension bridge. In the most preferred is a suspension bridge embodiment, the support cable is also an electrical power line cable 27 for electrical power distribution. FIG. 9 illustrates this suspended propulsion line embodiment with a corridor below the propulsion line 2 where the vehicle 1 can travel without hitting posts 11. In this application, either the connection cables 28 or the connectors on the connection cables 28 must provide electrical insulation suitable to the application. The suspension connections 28 between the support cable 26 and propulsion line 2 pull down on the support cable 26 and up on the propulsion line 2 during normal operation. If a vehicle 1 is stalled on the propulsion line 2, both the propulsion line 2 and support cable 26 sag to the point where both (2 and 26) pull upward to counter the weight of the stalled vehicle 1. Two or more propulsion lines 2 may be connected to the same support cable 26. Multiple propulsion lines may be connected to laterally-oriented beams that are supported by one or more support cables 26.

A Terreplane System suspension bridge may be used as a dedicated system to ferry automobiles over rivers and other expanses where travel.

Control of Vehicle Tilt (Lateral Pitch)—When a vehicle 1 is stalled with its weight supported by the propulsion line 2, the vehicle will tilt such that the vehicles center of gravity is directly below the propulsion line. As a method to keep the vehicle horizontal, the "effective" location of the connection to the arm 17 to the vehicle 1 (of the connector between the propulsion carriage and vehicle) may be adjusted in the lateral direction. This requires that this connection be laterally movable relative to the vehicle.

One embodiment that achieves this laterally movable connection is a lever-arm on top of the vehicle 1 that is able rotate about a point of connection to the top of the vehicle 1. The end of this lever-arm opposite the point of angular movement (rotation) is connected to the connection arm 17. Here, controlling the angle of the lever arm controls the lateral location of where the connection arm 17 "effectively" connects to the vehicle.

Linear Motor Propulsion—Preferably, Terreplane uses an open-sided coil 29 as part of linear motor for propulsion (for acceleration). A first description of the open-sided coil 29 embodiment is in terms of an illustrative means of fabrication where a flat rectangular core is wrapped in wire to form a coil around the flat core. The end view of the flat core encased in the coil has a left side 30 and right side 31. An open-sided coil 29 is formed by wrapping (folding) the flat core and coil around an object (e.g. a rod) such that the left side 30 and right side 31 approach each other to form a slot 7 between the left and right sides. The open-sided coil 29 is open on both ends and the slot 7 provides access to the cavity 32 inside the open-sided coil. This can be referred to as folding the core and coil to create an inner partial coil 33, an outer partial coil 34, a cavity 32, and a slot 7; cumulatively they form the open-sided coil 29.

Figure 10:
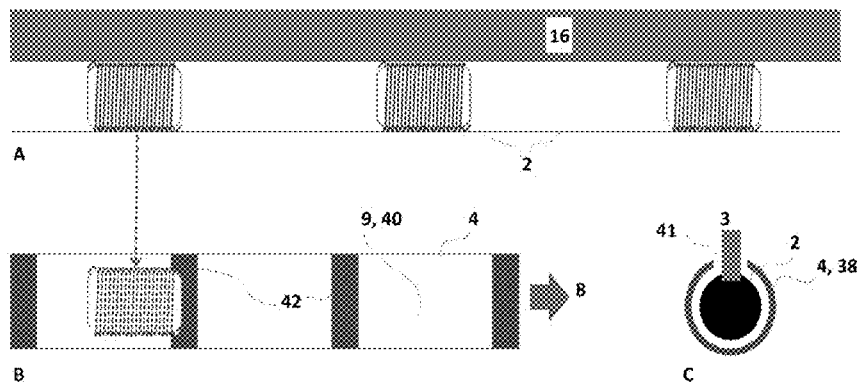
FIG. 10 is an illustration of a long-stator embodiment of Terreplane where a stationary series of coils are supported on a joist as part of the propulsion line and the propulsion carriage is comprised of discontinuous longitudinally-spaced conductive sections. The cross sections are: A—cross section of propulsion line, B—cross section of propulsion carriage, and c) end view of propulsion carriage engaged in propulsion line.

The open-sided coil is capable of traveling along a propulsion line 2 that has a cross-section that fits within the cavity 32 as illustrated by FIG. 10. The slot 7 allows connection of the propulsion line to a support structure (e.g. suspension cable). The embodiment is not limited to any particular orientation; the slot may be to the side, bottom, or any angle.

In a more-general open-sided coil embodiment, the core 35 is not limited to a flat geometry. The core 35 has two primary purposes in addition to the prospect for simplifying the manufacturing process. First, the core 35 provides a space between the top and bottom parts of the coil in a manner and of a material such that the current in the outer coil is not cancelled by the current of the inner coil for purposes of creating a magnetic field. For example, the core 35 could be comprised of ferromagnetic wires encased in a thermoplastic to create flexibility. Second, the core 35 creates the spacing between the inner and outer coils that can impact the shape of the cavity created when "folded" to create the inner partial coil 34, cavity 32, and slot 7.

Once folded, the open-sided coil 29 may be molded (or locked) into the folded position by methods known in the art. Alternatively, the folding process may be reversible through the use of clamping arms that push the left side 30 and right side 31 together. The reversible embodiment has utility for applications where the open-sided coil 29 is part of a propulsion carriage 5 that wraps around a propulsion line 2 in a manner that will not allow it to slip off the propulsion line 2 (FIG. 10).

As part of a linear motor, the propulsion line 2 is optionally comprised of longitudinally discontinuous sections of ferromagnetic material. As the open-sided coil 29 approaches (or partially surrounds) a section of ferromagnetic material (of similar cross-section as the cavity in coil) the magnetic forces pull the material into the coil 29. As the coil 29 approaches a ferromagnetic section of the propulsion line, the current in the coil 29 causes a magnetic field to pull the ferromagnetic material toward the longitudinal center of the coil 29 creating a pulling force on the propulsion line 2. To prevent a "braking" force, the current in the coil 29 is terminated before the ferromagnetic section reaches the center of the coil.

The open-sided coil 29 is an electromagnet comprised of a continuous electrically conductive wire adjacent to and wrapped around a core 35. The open-sided coils is comprised of the following: a longitudinal core 35 length dimension extending between the poles of the electromagnet, a core width and core thickness such that the width has a first side 30 and a second side 31 and such that the core width is greater than the core thickness, a folded shape such that the first side 30 and the second side 31 form a slot 7 whereby the slot 7 provides an entrance to a cavity 32 where the cavity 32 is continuously open from one longitudinal end to the other longitudinal end and along the slot 7 form end to end, whereby the cavity 32 is further comprised of: a relatively constant open cross-section perpendicular to the longitudinal dimension, and an inner surface 36 comprised of part of the continuously electrically conductive wire 33 on the surface running in a direction mostly perpendicular to the longitudinal dimension whereby, the conductive wire forms a circuit and application of voltage to the circuit creates a magnetic force longitudinally along the cavity and longitudinally along the core such that the magnetic poles of the cavity magnetic field are opposite the poles of the core 35.

About Open-Sided Coil—Preferably, the slot 7 has a uniform width from end to end along the cavity 32 where the width is less than the widest part of the cavity. A cumulative coil may be comprised of rings of wire that form round coils on part of the cumulative coil and open-sided coils on another part of the cumulative coil. An open-sided coil may be comprised of a wire with repeating paths of the following sequence: path of inner partial winding, path by slot with transition from inner partial winding to outer partial winding, path of outer partial winding, and path by slot with transition from outer partial winding to inner partial winding. A partial winding is a winding that is less than a complete loop. The coil may have AC or DC current applied to be magnetically active or may react to a magnetic field. The surroundings to a coil is all that is outside the surface of the open-sided coil formed by the surface enclosing the outer partial coil, the slot, and the two ends.

A horseshoe electromagnet may be used in this embodiment. A horseshoe electromagnet is an electromagnet with poles next to each other like a horseshoe magnet. Preferably, open-sided magnet coils and the horseshoe magnetic coils are symmetric to the vertical plane going through the propulsion line 2 when the coils are engaged with the propulsion line. In this symmetric position, the coils are in defined to be in their horizontal position which is their normal position for engaging with the propulsion line 2.

Hybrid Propulsion Line—A hybrid propulsion line has both sections of ferromagnetic (or magnetic) and conductive (non-ferromagnetic) material. The ferromagnetic sections are used to provide attractive propulsion force while the conductive sections are used to provide strong repulsive forces between the inner partial coil on the carriage 5 and the propulsion line 2. The propulsion carriage (for use with hybrid propulsion line) contains multiple open-slot electromagnets to provide the ability to pull toward ferromagnetic (or magnetic) sections of the propulsion line or to repel way from conductive sections of the propulsion line. The strongest attraction-based propulsion uses ferromagnetic or magnetic (hereafter F/M) sections of length about equal to the length of the electromagnet with spacing between F/M sections about equal to the length of the magnet. The open-sided coil 29 magnet turns on when the center of the open-sided coil is about half way between F/M sections and turns off when in the middle of a F/M section. Conductive sections of the propulsion line may be arranged to allow alternating current to be applied to carriage's 5 open-sided coil 29 to provide levitation without propulsion. Also, the addition of a conductive section between the F/M sections adds to the force forward.

Long Stator Propulsion—FIG. 10 and the previous paragraphs described short stator embodiments because the propulsion carriage, on which the electromagnets are a component, is much shorter than the propulsion line. The counter-part to the stator has reactive components, such as conductive sections that react to form repulsive forces in response to changing magnetic fields or ferromagnetic sections that react to form attractive forces in response to magnetic fields. The active part (stator) has electromagnets and the reactive component does not have electromagnets. An active component is herein described as engaging a reactive component by locking its proximity (close distance) and a magnetic field. Unless otherwise stated, the following sections use repulsive force (inductive) propulsion where the magnitude of the current in the coil varies with time.

On a long-stator embodiment of the Terreplane System, a stationary series of coils 37 (not open-sided) are supported on a joist 3 (or functionally similar support structure) as part of the propulsion line. The propulsion carriage is comprised of longitudinally discontinuous (longitudinally) sections of open-sided conducting material that forms an open-sided tube 38 that fits around the coils 37 without contacting connector structures 39 that fasten the coils 37 to the joists 3. The inner surface 40 of the tube 38 has a shape such that when the carriage 5 is placed over the propulsion line 2, there is a relatively uniform space between the tube's inside surface 40 of the coil's 37 out surface as illustrated by FIG. 9.

In the long stator embodiment, the propulsion line consists of a series of electromagnets 37 capable of being controlled to energize and de-energize through use of a control circuit. Example dimensions of the propulsion line coils 37 is 1 inch in diameter with connector structures 39 that are about 0.25 inch thick and 3 inches high with electromagnet 37 lengths of 3 inches. Preferably, groupings of 4 to 8 coils are that are spaced in 10 feet intervals. An electric circuit along the propulsion line 2 provides power to the coils.

Example dimensions of the propulsion carriage are with an inside surface of 1.5 inch diameter and tube slot 41 width (for propulsion line joist) of 0.75 inch. Example propulsion carriage length is 45 feet such that on average 3.5 coil groupings are engaging the propulsion carriage 5 at any one time. FIG. 10 illustrates the placement of a magnet 37 superimposed over the cross section of the propulsion carriage tube 38 at a location for energizing to provide a repulsive force. The part of the coil 37 inside the conductive section 42 positions the coil and propulsion line substantially in the center of the propulsion carriage tube creating a levitation (suspension).

Discrete Contact—As an alternative to propulsion lines 2 and methods of operation designed to apply even loads on propulsion lines, in the case of linear motor applications the magnetic interaction may be controlled to be greater at locations where the propulsion line 2, or beam 3 to which the propulsion line is attached, are connected to a supporting structure. An example supporting structure are locations where connection cables 28 supported by a support cable 26 are attached to a propulsion line.

In a long stator embodiment, the magnets on the propulsion line are preferably selectively located at the connection cable 28 points of support. It is possible to use inexpensive materials like nylon cord in the propulsion line 2 between these support locations. In applications where the propulsion line 2 bears part of the weight of the vehicle, the load for that weight is distributed in the propulsion carriage 5 such with the majority of the load at connection cable 28 points (or where the propulsion line is attached to the ceiling of a tunnel).

Long Stator versus Short Stator Propulsion—The long stator embodiment described in the immediately previous paragraphs is based on repulsive force propulsion with optional electromagnetic levitation (levitation may not be necessary if weight is supported by aerodynamic lift). The faster the change in a magnetic electric field (active component), the greater the induction force produced in conductors (reactive component); hence, for travel at higher velocities (e.g. >400 mph), long stators are preferred.

The long-stator system provides for opportunities to transfer energy to the vehicle. When the conductive sections of the propulsion carriage are in a coil configuration (normal coil or open-sided coil), a voltage is produced in the coil, and that voltage is able utilized by the vehicle or stored in batteries on the vehicle.

For each of the long stator and short stator examples, the description is provided in terms of the coil (normal or open-sided) being on either the carriage or part of the propulsion line. In general, propulsion and/or levitation is possible independent of whether the coil of each of these is on the carriage 5 or part of the propulsion line 2. The propulsion line could be an open-sided tube rather than a cable; however, the cable has an advantage of increased tensile strength.

Asymmetric coils—A standard electromagnet of uniform diameter is symmetric around the point of the geometric center. It is also symmetric around a longitudinal center line of the electromagnet.

An open-sided electromagnet, unless otherwise specified, is symmetric about the plane that extends through the longitudinal center line of the magnet and the center line of the slot of the magnet. It is also symmetric around the longitudinally-perpendicular plane that is both perpendicular to the longitudinal center line of the magnet and goes through the geometric center of the electromagnet.

For purposes of this document, an electromagnet that is not symmetric around the longitudinally-perpendicular plane is identified as longitudinally asymmetric.

A cone-shaped coil defined as a magnetic coil in the shape of a cone, rather than a cylinder, is longitudinally asymmetric. The (magnetic) flux density at the small-diameter end of a cone-shaped coil in greater than at the large-diameter end. An open-sided cone-shaped coil having a uniform cross section of the cavity that forms a straight slot along the side of the cone has a greater flux density in the cavity at the small end of the cone than at the large end.

A standard electromagnet without a core that is bent around a plastic cylinder such that one end forms an open-sided coils (around the plastic cylinder) and the other end of the electromagnet remains unbent becomes longitudinally asymmetric. If a mold is placed around the plastic cylinder and electromagnet and the plastic cylinder is removed, a uniform cavity replaces the plastic cylinder. The flux is greater at the open-sided coil end of this cavity. A straight slot along the side of the cavity along the edge farthest from the coils creates a longitudinally asymmetric coil capable of interacting with a propulsion line to create propulsion. This illustrative example both describes a method to manufacture this longitudinally asymmetric electromagnet, and also, defines an example electromagnet device. The device and method is not limited to cavities shaped from cylinders.

An additional embodiment is comprised of a magnetic coil wound to form a horseshoe magnet that is bent around a plastic cylinder to form a longitudinally asymmetric coil such where: a) both ends of the horseshoe magnet form geometrically similar open-sided coils with cavities at one end of the plastic cylinder and b) the other end of the plastic cylinder rests on but does not bend the middle-most coils at the longitudinal-middle of the horseshoe magnet. A resulting open-sided mold formed around the plastic cylinder results in cavity that has a higher flux at one end than the other.

In the general sense, a mold that preserves the shape of a magnetic coil, core, cavity, and slot may be a thermoset polymer that holds the components in place or may be any of a range of mechanical constraints that serves the same purpose. In the general sense, the cavity forms a shell 43 through which an insert 44 passes and the slot forms a path through with connections to the insert pass. More specifically for the embodiments of this invention, the shell 43 and insert 44 engage to form a linear motor. An example of a shell 43 is an open-sided reactive tube 38, and an example of an insert 44 is a propulsion line 2. The shell 43 component of the linear motor may be either on the carriage 5 or the propulsion line 2; and likewise, the insert 44 component may be either on the carriage 5 or the propulsion line 2.

Figure 11:
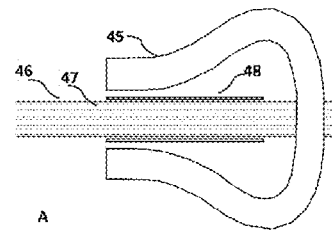
FIG. 11 is an illustration of a bent horseshoe electromagnet engaged with a propulsion line including a top view (A) and a side view (B).
Figure 11:
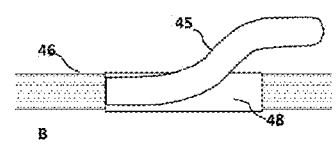

FIG. 11 illustrates a bent horseshoe electromagnet 45 engaged with a propulsion cable 46. The cable is comprised of strands of wire 47. Shielding 48 reduces electromagnetic interactions between to the bent horseshoe electromagnet 45 and the cable 46 until the cable is to the left of the horseshoe electromagnet 45. Induction forces propel the horseshoe electromagnet 45 relative to the cable 46. The ends of the bent horseshoe electromagnet are preferably open-ended coils that encase the cable 46.

A short-stator embodiment may use a longitudinally asymmetric shell 43 where the magnetic flux density in the cross section defined by the perimeter of the inner wall (that is uniform to match the component it engages with) is denser at one end of the cavity 32 than at the other end. When an electric current of changing magnitude is put through the coil, a net force vector is experienced by the reactive component insert 44 (component engaged by the coil) away from the electromagnet in the direction of the cavity 32 end with the high flux density that intersects the reactive component insert 44.

The shell's 43 coil may be an open-sided cone shape with a wide end and a narrow end opposite the wide end. Shielding is preferably selectively on the wide end (inside the coil) and is of the type the reduces the magnetic field density in center section of the wide end. The general design and operation of the longitudinally asymmetric open-sided coil is to generate a magnetic field of greater flux density at the narrow end such that when the longitudinally asymmetric open-sided coil surrounds a uniform conductive cable, changes in current of the coil will lead to a propulsion force on the coil from the narrow end to the wide end.

Long Stator Alternative Embodiment—A reactive insert 44 may be comprised of materials that provide attractive interaction, repulsive interaction, or longitudinally spaced combinations of attractive and repulsive interactions. A reactive component may be a coil that generates current and voltage in a wire conductor. A reactive component may be a coil of a shell 43 with the active component an electromagnet in the insert 44. A reactive component may be a simple metal tube with a slot 7.

Figure 12:
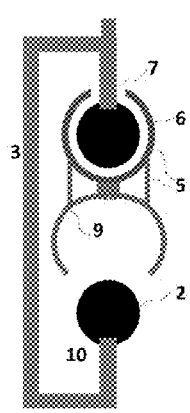
FIG. 12 is an illustration of a propulsion carriage with two open-sided tubes with slots facing outward and opposite.

Switching—FIG. 12 illustrates a method of switching where the propulsion line cable is part of a propulsion line 2 for a short stator embodiment is represented by the same image as the propulsion line electromagnet for the long stator embodiment. Likewise, an open-sided propulsion carriage tube is illustrated for the long stator embodiment by the same depiction as the open-sided propulsion carriage electromagnet for the short stator embodiment.

In the long stator embodiment, two open-sided propulsion carriage tubes (reactive components) are connected and positioned between two series of propulsion line electromagnets (active components, e.g. electromagnets). At switching locations two series of propulsion line electromagnets "allow for interaction with either of the two open-sided propulsion carriage tubes. The two series of propulsion line electromagnets proceed to different paths in the switch maneuver where the path taken by the propulsion carriage is the switch line.

The preferred method for the switch proceeds to following the switch line in the following sequence: a) only the electromagnets on the switch line are activated (or are activated to a much greater extent than the other line) and b) the open-sided propulsion carriage tube is tightened around the switch line and widened around the opposite line to allow the carriage to be disengaged and separate from the opposite line.

In a short stator embodiment, the open-sided propulsion carriage electromagnet has a slot capable of mechanically widening or narrowing to engage (or disengage) a propulsion line cable to perform a switch. The short-stator switching sequence includes: a) only the open-sided propulsion carriage electromagnet s around the switch active are activated (or are activated to a much greater extent than the other line) and b) the open-sided propulsion carriage electromagnet is tightened around the switch line and widened around the opposite line to allow the carriage to be disengaged and separate from the opposite (non-switch) line.

Switching Without Moving Parts—When the reactive counterpart is of an open-sided design (e.g. cross section is shape of horseshoe to a first approximation), the sides of the slot are optionally made in a manner whereby the geometry creates a greater induction force at the slot that opposes the exit (disengaging) of the propulsion line from the coil. When this design is used in the switching configuration of FIG. 12, stitching is controlled by the activation of electromagnets. The switch is performed without moving parts. In general, asymmetric designs allow for the stable levitation even though the components are not physically blocked from going apart. A similar design of the active component would allow a stable (levitation) position of a cable inside an open-sided electromagnet.

Figure 13:
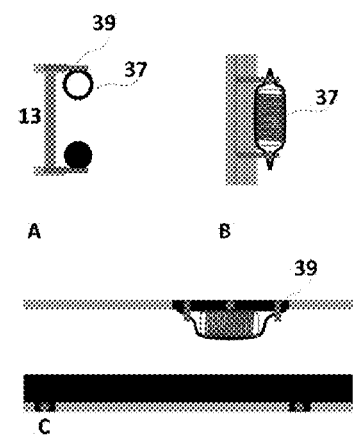
FIG. 13 is an illustration of embodiment with a long stator attached to the upper part of the propulsion line joist and a cable (reactive to a short stator) on the lower part of the propulsion line joist with end view (A), top view of coil (B), and side view (C).

Simple Configurations—FIG. 13 illustrates a preferred design for a propulsion line consisting of a joist with either a cable attached below the joist or electromagnets attached below the joist. The electromagnets need not be continuous with preferred designs having multiple electromagnets in the carriage at one time.

In the most-preferred design for the long-stator design electromagnets are both on the propulsion line and the propulsion carriage. Here, the propulsion carriage interacts with the propulsion line to provide both levitation and propulsion. This is performed using an open-sided electromagnet where the inner surface configures to allow passage of the electromagnet and is designed to interact with the bottom of the joist.

In a short-stator configuration, the circular component of FIG. 13 illustrates a cable. In the long-stator configuration, the circular component of FIG. 13 illustrates an electromagnetic coil that is most-preferably located at the connecting cables to the joist. The joist reinforces longitudinal straightness while a cable provides extra tensile strength to hold the weight of a vehicle if the vehicle does not have adequate lift. An auxiliary cable may be placed on the long-stator embodiment.

Hybrid Stator Configuration—The asymmetric open-sided coil embodiment for long-stator and short-stator configurations allow for a single propulsion line cable or single series of propulsion line electromagnets to provide both propulsion and suspension. The long stator embodiment is also able to provide power transfer to the vehicle.

FIG. 13 illustrates an embodiment with a long stator attached to the upper part of the propulsion line joist and a cable (reactive to a short stator) on the lower part of the propulsion line joist. A Hybrid Propulsion Carriage has both an open-sided propulsion carriage tube for interacting with the long stator and open-sided propulsion carriage electromagnets for interacting with the propulsion cable. A configuration with one open end up and the other down can match the propulsion line configuration of FIG. 13 and is physically blocked from derailing and allows for switching similar to the previously described method.

Cables, empty shells, or tubes could be put in place of the electromagnets in the long stator configuration when the propulsion line is designed for transit with the short stator embodiment. The propulsion carriage could periodically change from long stator to short stator propulsion whereby batteries on the vehicle are charged when using the long stator embodiment.

Wind Turbine Option—For large wind turbine systems, the tower/post that supports the wind turbine is only about 10% of the total investment and often of the same scale as the cost for electrical infrastructure. This embodiment consists of the following as illustrated by FIG. 15:

a) extending the tower to about twice its normal height.
b) attaching a wind turbine 45 with the axis of rotation 46 off to one side of the center of the tower in a manner that it can turn with changing wind direction going outside a circumference of structural support of the tower extension above the location of this shaft.
c) connection of a suspension cable at the top of the tower.
d) connection of the wind turbine such that it rotates above a lower propulsion line, inside connecting cables that connect the upper suspension cable to the lower propulsion line, and below the suspension cable.

The upper suspension cable optionally provides a vast part of the electrical infrastructure for a series of wind turbines in this configuration, and optionally provides power distribution for use by vehicles traveling on the propulsion line.

For rural areas with wind power potential, Terreplane suspension cables could be supported by this type of infrastructure with typical distances between posts being 0.1 to 2.5 miles and most preferably between 0.375 and 0.5125 miles. As a benchmark, high voltage power lines are often space at five per mile.

This wind turbine combination device is a suspension cable tower/post that supports a wind turbine comprised of a tower that is 1.05 to 3 times the diameter of the wind turbine path, a means of attaching a rotor bearing for the shaft of the turbine such that shaft is off to one side of the center of the tower in a manner that the shaft can orient toward the direction of wind whereby the shaft never crosses the turn support structure of the tower as extended above the location of the shaft whereby an effective second tower bearing (rotation embodiment) is on the tower at the location of the shaft along the tower with the inner part of the tower bearing attached to the tower and the outer part of the tower bearing attached the outer part of the rotor bearing said system further comprised of: a)—connection of a suspension cable at the top of the tower, and b) location of the wind turbine shaft along the vertical dimension of the tower such that the rotor rotates above a lower propulsion line, inside connecting cables that connect the upper suspension cable to the lower propulsion line, and below the suspension cable.

Linear Motor Options—The open sided coil, and especially the bent horseshoe electromagnet 45, may be used in linear motors as well as other applications where it is desirable to impart velocity on an electrically conductive element relative to the coil 45. For example, projectiles may be expelled from coil-containing devices such as a gun or nail driver. A series of weakly-connected projectiles may be propelled as a continuous feed that decouples during acceleration by the coils. In the case of projectiles being projected by a horseshoe electromagnet, a tube may be used without a slot. The configuration of the tube is not limited to a cylindrical configuration.

Within the context of this invention, linear motor is referred to a devices that moves an insert, such as in the insert 44 of FIG. 9, relative to the coil where the insert may have active, induced, or other magnetic fields.

In its basic embodiment, the projectile ejecting embodiment is a linear motor from which a projectile is ejected comprising: a horseshoe electromagnet, a tube located between the ends of the electromagnet, and ends of the horseshoe electromagnet located symmetric to a plane going through the propulsion line. The horseshoe electromagnet accelerates an insert that is propelled from a location where the horseshoe electromagnet resides.

The invention claimed is:

1. A transportation system comprising:
a line supported at multiple locations along a longitudinally extending surface and presenting a longitudinally extending route for travel of the transportation system,
a propulsion carriage producing a tensile force on said line and an acceleration on said propulsion carriage where said acceleration is in the direction of said route,
a vehicle having a weight, a body, a front portion of the body, and a plurality of aerodynamic surfaces on said body, said front portion comprising generally one-third of said body,
said vehicle connected to said propulsion carriage,
wherein said propulsion carriage accelerates said vehicle along said route, and
wherein said aerodynamic surfaces create a lift on said vehicle when accelerated by said propulsion carriage, and
wherein the propulsion carriage comprises a short stator and said short stator induces magnetic fields in said line creating said tensile force, and
wherein said lift is greater than one-half said weight of said vehicle.

2. The transportation system of claim 1 wherein said lift is greater than 99% of the weight of said vehicle.

3. The transportation system of claim 1 wherein aerodynamic surfaces on the front portion of the body create a lift greater than 33% of the weight of said vehicle.

4. The transportation system of claim 1 wherein the line is a wire rope cable comprised of electrically conductive metal.

5. The transportation system of claim 1 further comprising
a connector arm connecting said propulsion carriage to said vehicle and
having joints that allow the vehicle to fly at different distances from said propulsion carriage.

6. The transportation system of claim 5 comprising:
two carriage connector arm joints on opposite sides of the carriage, and
two vehicle connector arm joints
said vehicle connector arm joints on vertically extending arm connections on the vehicle and
during at least one distance of approach the propulsion line located between the two vehicle connector arm joints aligned in a horizontal geometric plane.

7. The transportation system of claim 1 further comprising:
a hinge joint connecting said vehicle to said propulsion carriage, said hinge joint having a line of rotation,
wherein the line of rotation is in the same geometric plane as the propulsion line.

8. A linear motor comprising:
an open-sided coil comprised of a first partial coil, a second partial coil, an open cavity inside said first partial coil, an inner surface between said first partial coil and said open cavity, and an outer surface surrounding both the first partial coil and the second partial coil;
said cavity having an open cavity first end, an open cavity second end, and a slot extending longitudinally from said first end to said second end; and
an insert having electromagnetic interactions with said coil;
a corridor extending longitudinally along a route, said corridor having a cross section perpendicular to the route, said cross section having a circumference,
further comprising an aluminum surface on the corridor wherein the linear motor is a linear induction motor and the corridor is an armature of the linear motor,
wherein the first partial coil comprises at least one wire extending angularly more than 180 degrees in a radially-spaced position from said insert, and
wherein said first partial coil is connected to said second partial coil in an electrical circuit,
wherein said insert has a position through said cavity from said open cavity first end to said open cavity second end,
wherein said circumference comprises a geometric center, a radial distance vector from said center for each point on said circumference, an angle for each radial distance vector, and an angular direction between any two points on said circumference,
wherein said angular direction is either clockwise or counterclockwise, and
wherein the first partial coil and the second partial coil are connected in an electrical circuit,
wherein the first partial coil wraps around over half said circumference in a first angular direction and the second partial coil wraps around over half said circumference in an angular direction opposite the first angular direction.

9. A transportation system comprising:
a line supported at multiple locations and presenting a longitudinally extending route for travel of the transportation system,
a propulsion carriage producing a longitudinal force on said line and an acceleration on said propulsion carriage where said acceleration is in the direction of the route,
a plurality of carriage aerodynamic surfaces on said propulsion carriage,
a vehicle having a weight, a body, and vehicle aerodynamic surfaces on the body,
said vehicle connected to said propulsion carriage,
a total weight equal to said vehicle weight plus weights of any devices attached to said vehicle,
a design travel speed where aerodynamic surfaces provide a lift equal to and opposite said total weight,
wherein the propulsion carriage comprises a short stator and said short stator induces magnetic fields in said line creating said acceleration, and
wherein said propulsion carriage accelerates said vehicle along said route, and
wherein said line is flexible and transfer of the vehicle weight to the line without aerodynamic lift produces a bending of the line beyond maximum tolerances for travel at said design travel speed.

10. The transportation system of claim 9 where the line is comprised of wire rope.

11. The transportation system of claim 9 where said propulsion carriage exerts vertical and lateral compression forces on the line wherein the only net force on said line is a longitudinal propulsion force.

* * * * *